US010788652B2

(12) United States Patent
Masuda et al.

(10) Patent No.: US 10,788,652 B2
(45) Date of Patent: *Sep. 29, 2020

(54) IMAGING OPTICAL SYSTEM, IMAGING DEVICE AND IMAGING SYSTEM

(71) Applicant: Ricoh Company, Ltd., Tokyo (JP)

(72) Inventors: Kensuke Masuda, Kawasaki (JP); Noriyuki Terao, Sendai (JP); Yoshiaki Irino, Kawasaki (JP); Tomonori Tanaka, Yokohama (JP); Nozomi Imae, Yokohama (JP); Toru Harada, Yokohama (JP); Hirokazu Takenaka, Kawasaki (JP); Hideaki Yamamoto, Yokohama (JP); Satoshi Sawaguchi, Yokohama (JP); Daisuke Bessho, Kawasaki (JP); Hiroyuki Satoh, Kawasaki (JP); Makoto Shohara, Hachioji (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,697

(22) Filed: Apr. 15, 2019

(65) Prior Publication Data

US 2019/0243110 A1 Aug. 8, 2019

Related U.S. Application Data

(63) Continuation of application No. 15/650,522, filed on Jul. 14, 2017, now Pat. No. 10,295,797, which is a (Continued)

(30) Foreign Application Priority Data

Aug. 31, 2011 (JP) .................................. 2011-188643
May 28, 2012 (JP) .................................. 2012-121269

(51) Int. Cl.
*H04N 5/225* (2006.01)
*G02B 13/06* (2006.01)
(Continued)

(52) U.S. Cl.
CPC ........... *G02B 13/06* (2013.01); *G02B 17/023* (2013.01); *H04N 5/2253* (2013.01); *H04N 5/2254* (2013.01); *H04N 5/23238* (2013.01)

(58) Field of Classification Search
CPC .............. H04N 5/2253; H04N 5/2254; H04N 5/23238; G02B 13/06; G02B 17/023
(Continued)

(56) References Cited

U.S. PATENT DOCUMENTS 7,382,399 B1 6/2008 McCall et al.
9,110,273 B2 * 8/2015 Masuda ............... H04N 5/2253
(Continued)

FOREIGN PATENT DOCUMENTS

EP 2 562 577 A1 2/2013
GB 2 385 840 A 9/2003
(Continued)

OTHER PUBLICATIONS

European Office Action dated Mar. 20, 2015 in European Application No. 12182432.0 (8 pages).
(Continued)

*Primary Examiner* — Michael Lee
(74) *Attorney, Agent, or Firm* — Xsensus LLP

(57) ABSTRACT

An imaging device includes two imaging optical systems each of the imaging optical systems including a wide-angle lens having an angle of view wider than 180 degrees, and an imaging sensor configured to image an image by the wide-angle lens, so as to obtain an image in a solid angle of $4\pi$ radian by synthesizing the images by the respective imaging optical systems, wherein the wide-angle lens of each of the (Continued)

imaging optical systems includes, in order from an object side to an image side, a front group having a negative power, a reflection surface and a back group having a positive power, and is configured to bend an optical axis of the front group by the reflection surface at 90 degrees toward the back group.

6 Claims, 13 Drawing Sheets

Related U.S. Application Data continuation of application No. 14/754,279, filed on Jun. 29, 2015, now Pat. No. 9,739,983, which is a continuation of application No. 13/595,490, filed on Aug. 27, 2012, now Pat. No. 9,110,273.

(51) Int. Cl.
*G02B 17/02* (2006.01)
*H04N 5/232* (2006.01)

(58) Field of Classification Search
USPC .......................................................... 348/36
See application file for complete search history.

(56) References Cited

U.S. PATENT DOCUMENTS

| | | | | |
|---|---|---|---|---|
| 9,739,983 | B2* | 8/2017 | Masuda | H04N 5/2253 |
| 10,295,797 | B2* | 5/2019 | Masuda | H04N 5/2253 |
| 2003/0007793 | A1* | 1/2003 | Suzuki | G03B 37/02 |
| | | | | 396/20 |
| 2004/0201769 | A1 | 10/2004 | Yoshikawa et al. | |
| 2005/0088762 | A1 | 4/2005 | Ohashi | |
| 2005/0286136 | A1 | 12/2005 | Masubuchi et al. | |
| 2006/0176576 | A1 | 8/2006 | Nagahara et al. | |
| 2007/0064143 | A1 | 3/2007 | Soler et al. | |
| 2009/0052050 | A1 | 2/2009 | Kweon et al. | |
| 2010/0045773 | A1 | 2/2010 | Ritchey | |
| 2010/0073459 | A1 | 3/2010 | Wilson et al. | |
| 2012/0008103 | A1 | 1/2012 | Lalley et al. | |
| 2016/0006933 | A1 | 1/2016 | Zimmerman et al. | |

FOREIGN PATENT DOCUMENTS

| | | |
|---|---|---|
| JP | 11-508384 A | 7/1999 |
| JP | 2003-248169 A | 9/2003 |
| JP | 2005210651 A | 8/2005 |
| JP | 2005-283616 A | 10/2005 |
| JP | 2007-511117 A | 4/2007 |
| JP | 2010-271675 A | 12/2010 |
| JP | 2013-066163 A | 4/2013 |
| WO | 00/60870 A1 | 10/2000 |
| WO | 01/68540 A2 | 9/2001 |
| WO | 2005/046240 A1 | 5/2005 |

OTHER PUBLICATIONS

Extended European Search Report dated Mar. 22, 2013 in Patent Application No. 12182432.0.
Extended Search Report dated Dec. 15, 2015 in European Patent Application No. 15175323.3.
Japanese Office Action dated Mar. 22, 2016 in Patent Application No. 2012-121269.
Japanese Office Action dated Feb. 6, 2018 in Patent Application No. 2017-017029, 4 Pages.
Communication pursuant to Article 94(3) EPC issued in corresponding European Application No. 15175323.3 dated Nov. 21, 2018, 4 pages.
Extended European Search Report dated Feb. 10, 2020 issued in corresponding European Patent Application No. 19203363.7, 7 pages.
Office Action dated Jun. 9, 2020, issued in corresponding Japanese Patent Application No. 2019-111899, 5 pages.

* cited by examiner

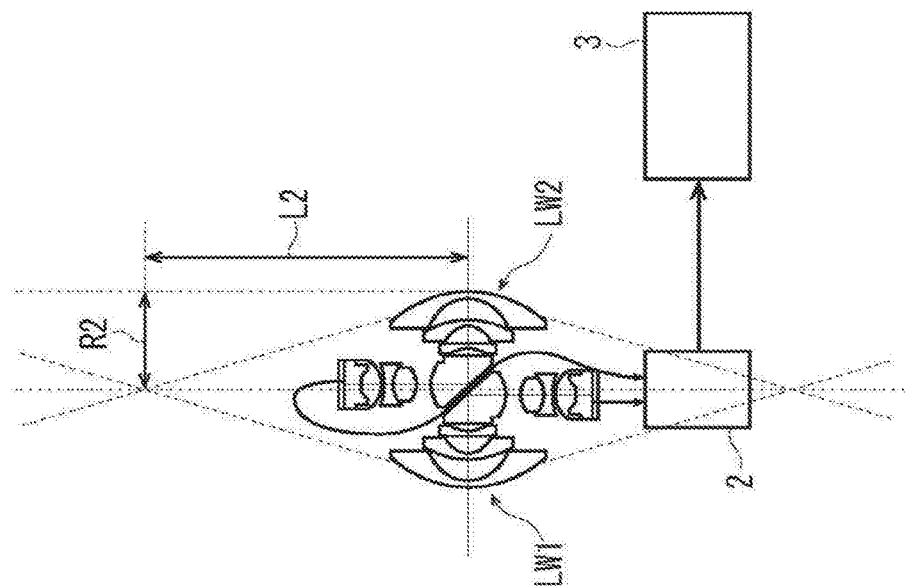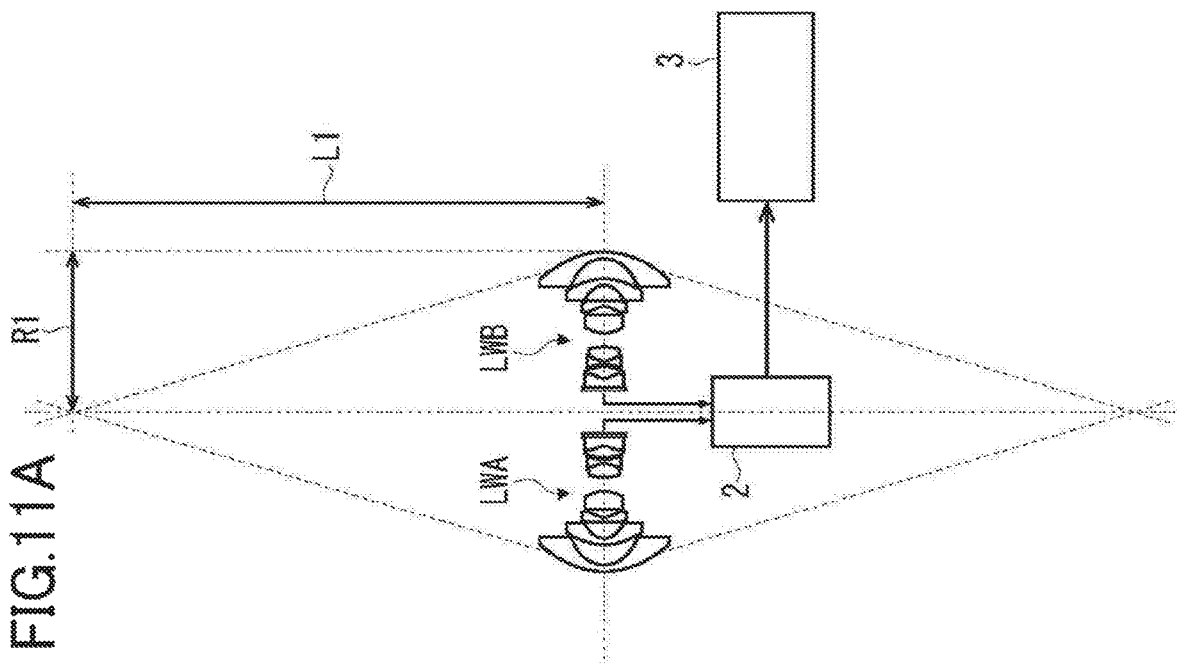

IMAGING OPTICAL SYSTEM, IMAGING DEVICE AND IMAGING SYSTEM

CROSS REFERENCE TO RELATED APPLICATIONS

This application is a continuation of U.S. application Ser. No. 15/650,522, filed Jul. 14, 2017, which is a continuation of U.S. application Ser. No. 14/754,279, filed Jun. 29, 2015 (now U.S. Pat. No. 9,739,983), which is a continuation of U.S. application Ser. No. 13/595,490, filed Aug. 27, 2012 (now U.S. Pat. No. 9,110,273), which claims the benefit of priority from Japanese Patent Application No. 2011-188643, filed on Aug. 31, 2011 and Japanese Patent Application No. 2012-121269, filed on May 28, 2012, the contents of each are hereby incorporated by reference in their entirety.

BACKGROUND

Field of the Invention

The present invention relates to an imaging optical system, imaging device and imaging system.

Description of the Related Art

An omnidirectional imaging device in which two imaging optical systems each including a wide-angle lens having an angle of view wider than 180 degrees and an imaging sensor for imaging an image by the wide-angle lens are combined, and an image by each of the imaging optical systems is synthesized to obtain an image in a solid angle of 4π radian is conventionally known (refer to Japanese Patent Application Publication No. 2010-271675).

Such an omnidirectional imaging device is able to obtain omnidirectional image information at one time, so it can be effectively used for a monitoring camera, car-mounted camera or the like. Recently, such an omnidirectional imaging device is required to be downsized so that it can be used as a portable omnidirectional imaging device.

For example, in the case of coverage, extremely accurate image information can be obtained by using a portable omnidirectional imaging device in a handheld state.

In order to achieve a small omnidirectional imaging device, it is necessary to downsize a wide-angle lens for use in an imaging optical system. It is also necessary for a wide-angle lens to have a reasonable performance in order to obtain a preferable image. Thus, it is difficult to reduce the number of lenses constituting the wide-angle lens.

Upon a certain amount of increase in the number of lenses constituting a wide-angle lens, the entire length of the wide-angle lens is increased. If two wide-angle lenses are combined to be opposite to each other, a non-photographable space where the maximum angle of view light beams entering in the respective wide-angle lenses do not overlap to each other is increased unless the angle of view is considerably increased.

If the angle of view is increased for downsizing a wide-angle lens, a part of an incident light beam is blocked by a substrate on which an imaging sensor is mounted, so that a part of the substrate is photographed on an image by the wide-angle lens. Not only an imaging sensor, but also a circuit element for driving the imaging sensor and a circuit element required for electric connection with an external device are mounted on the substrate. Consequently, the size of the substrate is inevitably increased larger than the size of the imaging sensor.

Japanese Patent Application Publication No. 2010-271675 does not disclose a technique relative to vignetting of an incident light beam by such a substrate.

SUMMARY

The present invention has been made in view of the above circumstances. An object of the present invention is to effectively solve a problem that an incident light beam is blocked by a substrate of an imaging optical system for use in an imaging device, and to provide a small imaging device and an imaging system.

In order to achieve the above object, one embodiment of the present invention provides an imaging device including two imaging optical systems each of the imaging optical systems including a wide-angle lens having an angle of view wider than 180 degrees, and an imaging sensor configured to image an image by the wide-angle lens, so as to obtain an image in a solid angle of 4π radian by synthesizing the images by the respective imaging optical systems, wherein the wide-angle lens of each of the imaging optical systems includes, in order from an object side to an image side, a front group having a negative power, a reflection surface and a back group having a positive power, and is configured to bend an optical axis of the front group by the reflection surface at 90 degrees toward the back group, the imaging sensor is provided in a substrate having a predetermined circuit and a size which is larger than that of the imaging sensor, the two imaging optical systems are combined such that the front groups face opposite directions to each other with the optical axes of the front groups being aligned and the back groups face opposite directions to each other, where a surface including the aligned optical axes of the front groups of the two wide-angle lenses, which is orthogonal to the optical axis of the back group, is an S-surface, a line which passes through an intermediate point of the optical axes of the two back groups on the S-surface and is parallel to the optical axis of the back group is a P-line, and a distance between the optical axes of the two back groups is D and a distance between the S-surface and a substrate surface of the substrate is L, and where an intersection line by combination of conical surfaces formed by maximum angle of view light beams of the wide-angle lenses around the optical axes of the front groups of the respective imaging optical systems and a plane parallel to the substrate surface of the substrate is X1 relative to one wide-angle lens and X2 relative to the other wide-angle lens, the distances D, L and the size and a shape of the substrate are set according to a maximum angle of view F of the wide-angle lens such that corner portions of the substrate do not locate outside an area surrounded by the intersection lines X1, X2.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIGS. 11A, 11B are views each describing an effect in an omnidirectional imaging device in which an optical path of a wide-angle lens is bent.

DESCRIPTION OF THE PREFERRED EMBODIMENTS

Hereinafter, embodiments will be described.

Figure 1A:
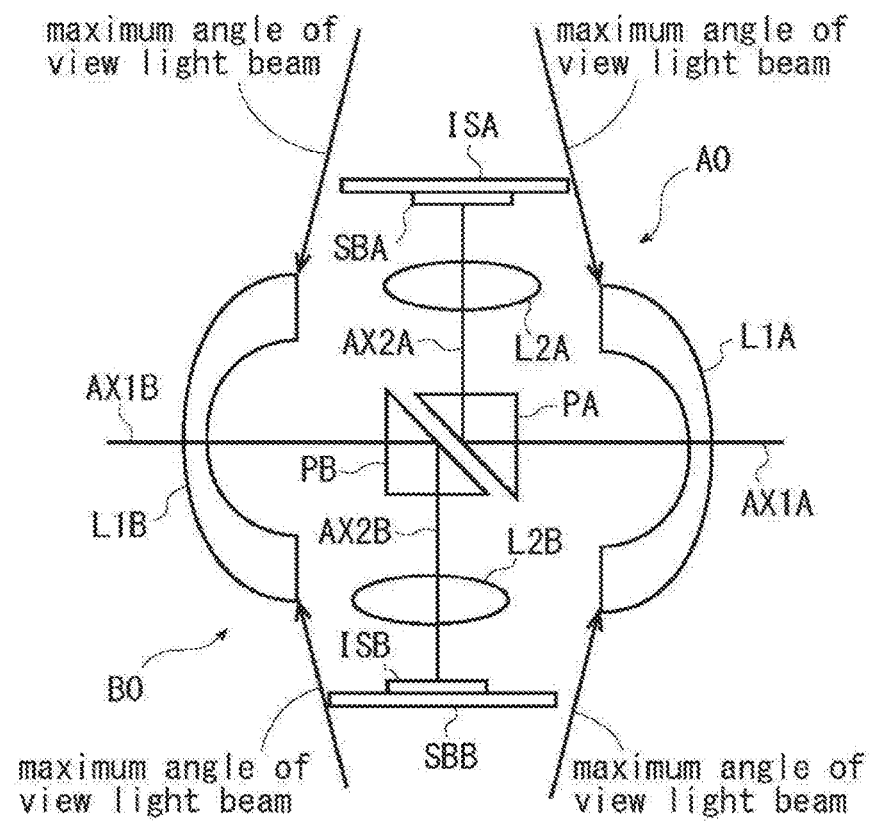
FIGS. 1A, 1B are views each illustrating an omnidirectional imaging device in which two imaging optical systems are combined.

FIG. 1A is a view illustrating only a main portion of an omnidirectional imaging device according to one embodiment.

Two imaging optical systems A0, B0 are combined in this embodiment.

The imaging optical systems A0, B0 are the same (manufactured by the same specification). For the purpose of simplifying the description, A is added to the ends of reference numbers for members constituting the imaging optical system A0 and B is added to the ends of reference numbers for members constituting the imaging optical system B0. Hereinbelow, only the imaging optical system A0 will be described.

The imaging optical system A0 includes a wide-angle lens having an angle of view wider than 180 degrees and an imaging sensor which images an image by the wide-angle lens.

The wide-angle lens of the imaging optical system A0 includes a negative power front group L1A, a prism PA as a reflection surface and a positive power back group L2A, and is configured to bend an optical axis AX1A of the front group toward the back group L2A by the reflection surface.

Each of the front and back groups L1A, L2A is illustrated by one lens in the figures for simplifying the description, but each of the front and back groups can include two or more lenses.

The light from the object side enters in the front group L1A, and is reflected by the reflection surface of the prism PA. The optical axis of the light is bent at 90 degrees toward the back group L2A. In FIG. 1A, reference number AX2A illustrates the optical axis bent at 90 degrees. This optical axis AX2A is referred to as a back group optical axis. The light beam reflected by the reflection surface of the prism PA enters in the back group L2A along the back group optical axis AX2A, and forms an object image on a light-receiving surface of an imaging sensor ISA after passing through the back group L2A.

The imaging sensor ISA outputs a received object image as image data.

The imaging sensor ISA is provided in a substrate SBA.

The substrate SBA includes a not shown circuit element for driving the imaging sensor ISA and a not shown circuit element required for eclectic connection with an external device. The size of the substrate SBA is larger than the size of the imaging sensor ISA.

The same two imaging optical systems A0, B0 are combined as illustrated in FIG. 1A.

More specifically, the imaging optical systems A0, B0 are combined such that the front groups L1A, L1B face opposite directions to each other with the optical axes AX1A, AX1B thereof (front group optical axes) being aligned (the front group L1A of the imaging optical system A0 faces the right in FIG. 1A and the front group L1B of the imaging optical system B0 faces the left in FIG. 1A), and the back groups L2A, L2B face opposite directions to each other with the optical axes AX2A, AX2B thereof being parallel to each other (the back group L2A of the imaging optical system A0 faces up in FIG. 1A and the back group L2B of the imaging optical system B0 faces down in FIG. 1A).

Figure 1B:
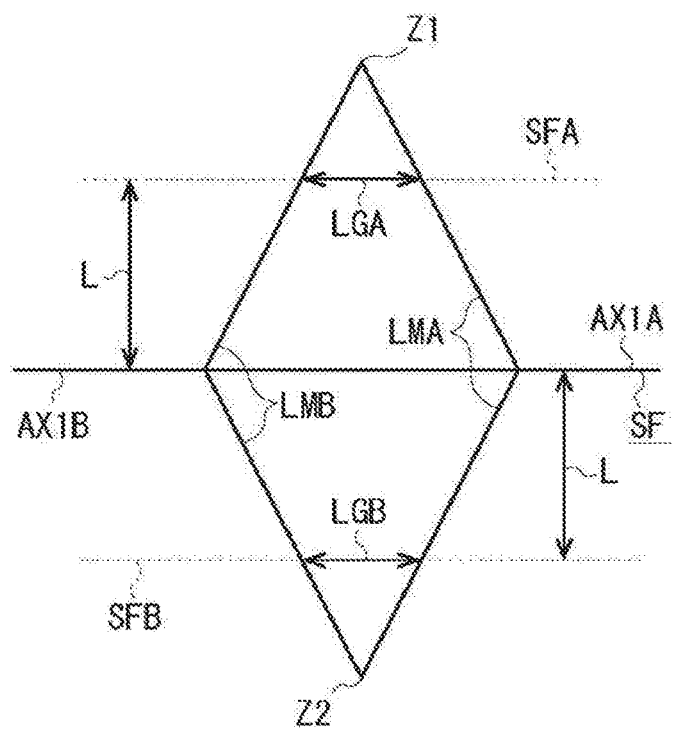

The wide-angle lens of the imaging optical system A0 includes an angle of view larger than 180 degrees, so that the set of the maximum angle of view light beams (light beams entering at the maximum angle of view) entering in the wide-angle lens forms a conical surface LMA with the front group optical axis AX1A of the imaging optical system A0 as an axis as illustrated in FIG. 1B.

Similarly, the wide-angle lens of the imaging optical system B0 includes an angle of view larger than 180 degrees, so that the set of the maximum angle of view light beams entering in the wide-angle lens forms a conical surface LMB with the front group optical axis AX1B of the imaging optical system B0 as an axis as illustrated in FIG. 1B.

These conical surfaces LMA, LMB intersect in positions Z1, Z2 illustrated in FIG. 1B. Since the front group optical axes AX1A, AX1B are aligned to each other, the portions where the conical surfaces LMA, LMB intersect are circles with the front group optical axis as a center. The positions Z1, Z2 illustrated in FIG. 1B are points on the circles.

Reference number SF denotes an S-surface including the aligned front group optical axes AX1A, AX1B of the two wide-angle lenses, which is orthogonal to the back group optical axes AX2A, AX2B.

Namely, in FIG. 1B, the S-surface SF is a plane including the aligned front group optical axes AX1A, AX1B of the two wide-angle lenses, which is orthogonal to the figure.

In FIG. 1B, a plane SFA illustrates a surface position where the substrate SBA in FIG. 1A is provided, and a plane SFB illustrates a surface position where the substrate SBB in FIG. 1A is provided. The plane SFA is referred to as a substrate surface of the substrate SBA and the plane SFB is referred to as a substrate surface of the substrate SBB.

The substrate surfaces SFA, SFB are located in symmetric positions relative to the S-surface SF.

In FIG. 1B, a length LGA is a length of a region where the substrate surface SFA intersects with the conical surfaces LMA, LMB in the front group optical axis AXA1 direction. Similarly, a length LGB is a length of a region where the substrate surface SFB intersects with the conical surfaces LMA, LMB in the front group optical axis AXA1 direction, and LGA=LGB.

Figure 2:
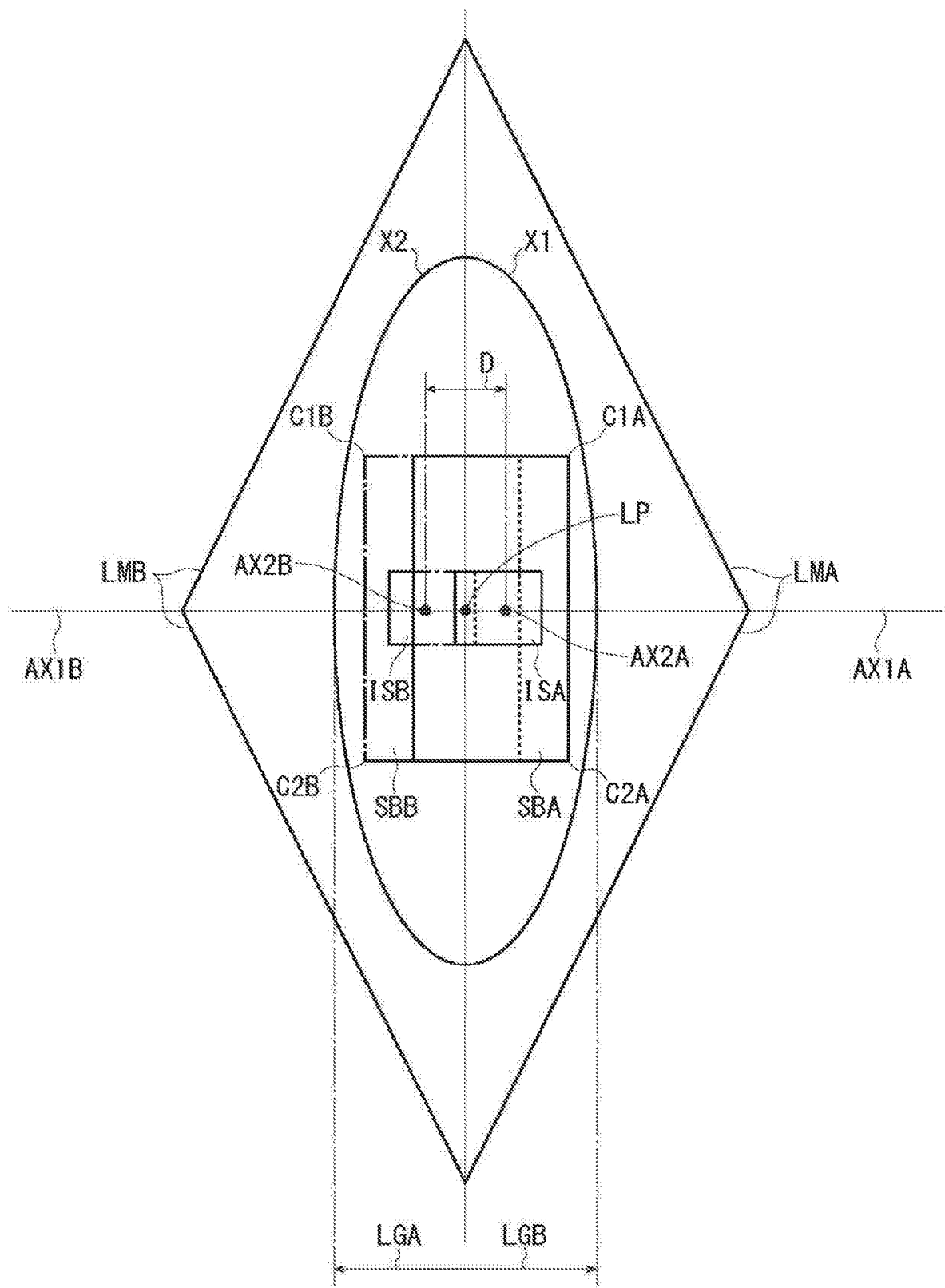
FIG. 2 is a view illustrating the arrangement of a substrate.

FIG. 2 is a perspective view illustrating the positional relationship of the substrates SBA, SBB as seen in FIG. 1A from above.

The S-surface SF including the aligned front group optical axes AX1A, AX1B of the two wide-angle lenses, which is orthogonal to the back group optical axes AX2A, AX2B, is a plane which conforms to the figure.

A line passing through the middle point of the two back group optical axes AX2A, AX2B on the S-surface SF and parallel to the back group optical axes AX2A, AX2B is a P-line LP.

The back group optical axis AX2A passes through the central portion of the light-receiving surface of the imaging sensor ISA and the back group optical axis AX2B passes through the central portion of the light-receiving surface of the imaging sensor ISB.

The distance between the two back group optical axes AX2A, AX2B is D.

As illustrated in FIG. 1B, the distance between the substrate surfaces SFA, SFB of the substrates SBA, SBB and the S-surface SF is L.

In FIG. 1B, the substrate surfaces SFA, SFB virtually cut the conical surfaces LMA, LMB parallel to the S-surface SF. This virtually cut surface intersects with the conical surface LMA at an intersection line illustrated by X1 in FIG. 2. The intersection line X1 is a parabola.

Similarly, the virtually cut surface intersects with the conical surface LMB at an intersection line illustrated by X2 in FIG. 2. The intersection line X2 is also a parabola. Since the substrate surface SFB is symmetric to the substrate surface SFA and the S-surface SF, the intersection line of the substrate surface SFB and the conical surfaces LMA, LMB is the same as the above intersection lines X1, X2.

Hereinbelow, in FIGS. 2, 3, the intersection lines X1, X2 illustrate the intersection lines of the substrate surfaces SFA, SFB and the conical surfaces LMA, LMB (in FIGS. 2, 3, these are overlapped).

In order to prevent object light from being blocked by the substrates SBA, SBB, a rectangle as seen from the direction orthogonal to FIG. 2, which is formed by corner portions C1A, C2A of the substrate SBA on the intersection line X1 side and corner portions C1B, C2B of the substrate SBB on the intersection line X2 side, falls within the area surrounded by the intersection lines X1, X2, and the corner portions C1A, C2A, C1B, C2B do not locate outside the above area.

A condition to achieve the above will be hereinbelow described.

Figure 3:
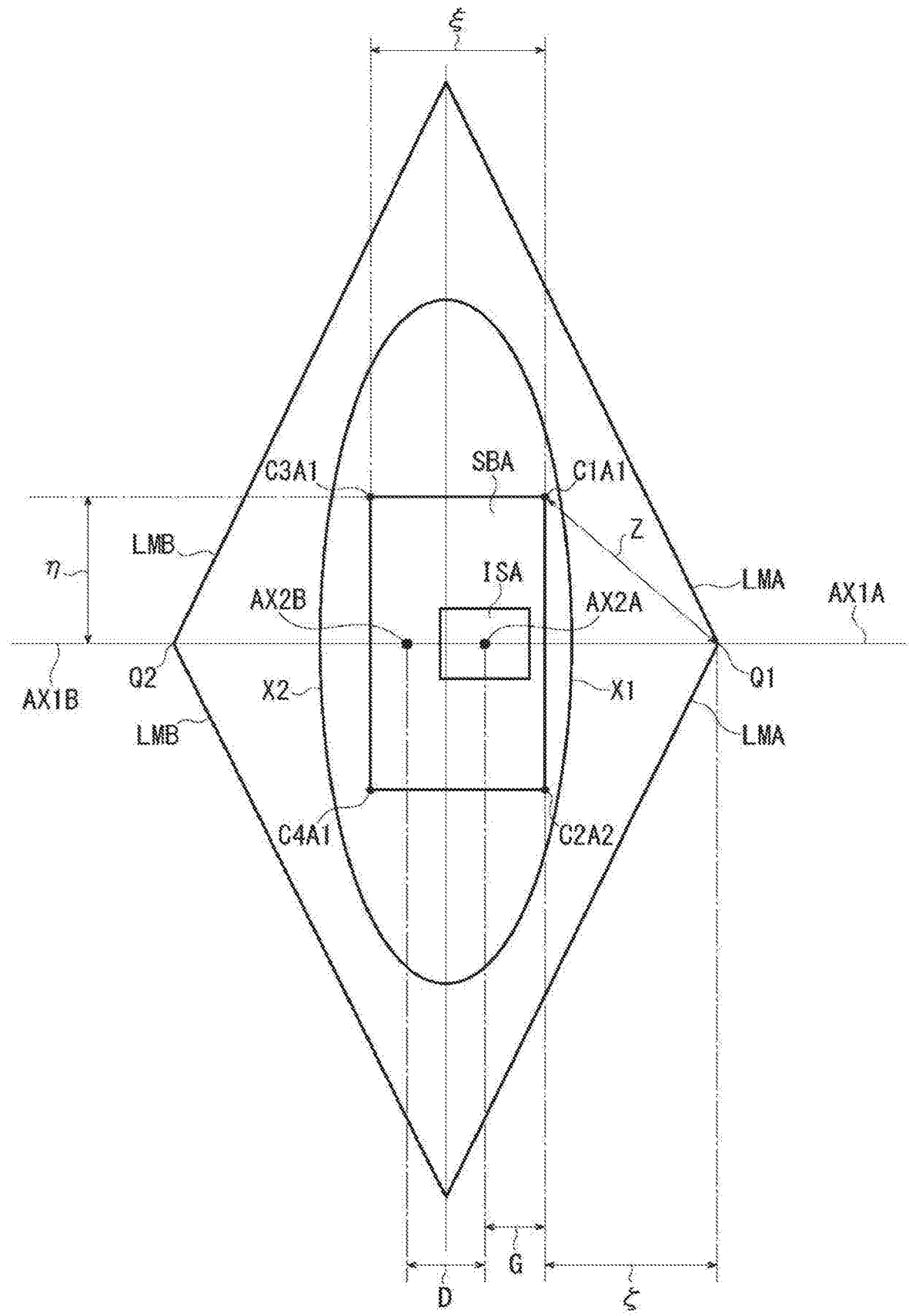
FIG. 3 is a view illustrating a condition which prevents an imaging light beam from being blocked by a substrate.

FIG. 3 is a view illustrating the simplified FIG. 2 and a positional relationship between the substrate SBA on which the imaging sensor ISA is mounted and other portions projected on the S-surface SF. For the purpose of simplifying the description, the substrate SBA is set to a rectangular shape and the length thereof is set to $2\eta$ and the width thereof is set to $\xi$.

As illustrated in the figure, the apex of the conical surface LMA is Q1, and the projection length on the S-surface SF from the longitudinal side of the substrate SBA to the apex O1 is $\zeta$.

Reference number C1A1 in FIG. 3 illustrates a position where the corner portion C1A of the substrate SBA is projected on the S-surface SF. In this case, the distance between the apex Q1 and the position C1A1 Z is as follows.

$$Z=\sqrt{(\eta^2+\zeta^2)}$$

The corner portion C1A of the substrate SBA is actually located at the height L from the S-surface SF as illustrated in FIG. 1B. In this case, it is considered that the corner portion C1A is located on the intersection line X1. This condition is a borderline such that the corner portion C1A does not locate outside the intersection line X1.

In this case, the corner portion C1A is located on the conical surface LMA.

The apex angle of the conical surface LMA becomes as follows where the maximum angle of view of the wide-angle lens of the imaging optical system A0, F>180 degrees.

$$180-(F-180)=360-F(\text{degree})$$

The half angle of view thereof becomes as follows.

$$180-(F/2)$$

When the corner portion C1A is located on the intersection line X1, the following equation is established.

$$\tan\{180-(F/2)\}=L/Z=L/\sqrt{(\eta^2+\zeta^2)}$$

Accordingly, the condition in which the corner portion C1A does not locate outside the intersection line X1 is as shown in the following condition (1).

$$\tan\{180-(F/2)\}>L/\sqrt{(\eta^2+\zeta^2)} \quad (1)$$

The same can be said for the corner portion C2A. The position illustrated by reference number C2A2 in FIG. 3 is a position where the corner portion C2A of the substrate SBA in FIG. 2 is projected on the S-surface SF.

A distance $\zeta+G$ is determined by the specification of the imaging optical system A0 where a distance between the side by the corner portions C1A, C2A and the back group optical axis AX2A of the imaging optical system A0 is G as illustrated in FIG. 3. G, $\eta$, $\xi$ are defined as the specifications of the substrate SBA, and the distance $\zeta$ is defined by the specification of the substrate SBA. The distance L and the angle of view F are defined by the specification of the imaging optical system A0.

Therefore, by setting the size and the installation of the substrate SBA to satisfy the above condition (1) according to the specification of the imaging optical system A0, the imaging light beams can be prevented from being blocked by the corner portions C1A, C2A of the substrate SBA.

In FIG. 3, reference numbers C3A1, C4A1 illustrate positions where two corner portions except the corner portions C1A, C2A of the four corner portions of the substrate SBA are projected on the S-surface SF. Corner portions corresponding to these are C3A, C4A.

It is necessary for the corner portions C3A, C4A not to locate outside the intersection line X2.

A distance between the side end portion connecting the corner portions C3A, C4A of the substrate SBA and the apex Q2 of the conical surface LMB is as follows in view of the symmetric property of the right and left direction in FIG. 3.

$$(\xi+G+D/2)-(\xi-G-D/2)=\zeta-\xi+2G+D=\chi$$

By satisfying the following condition (2) in which the amount $\chi$ is substituted into $\zeta$ of the condition (1), the corner portions C3A, C4A do not locate outside the intersection line X2.

$$\tan\{180-(F/2)\}>L/\sqrt{(\eta^2+\chi^2)} \quad (2)$$

This can be basically achieved by adjusting the distance D between the back group optical axes AX2A, AX2B of the imaging optical systems A0, B0.

The substrate SBA is only described in the above description, but the substrate SBB has a shape which is the same as that of the substrate SBA and the relationship between the substrate SBB and the conical surfaces LMA, LMB is similar to that of the substrate SBA. Therefore, the same condition is satisfied for the substrate SBB.

More specifically, the distances D, L and the size and the shape of the substrates SBA, SBB are set according to the maximum angle of view F of the wide-angle lens such that the corner portions of the substrate do not locate outside the area surrounded by the intersection lines X1, X2.

In the case of actually constituting the omnidirectional imaging device, the two imaging optical systems are housed in a common housing. In this housing, it is required that the thickness portion be located between the corner portions of the substrates SBA, SBB and the intersection lines X1, X2.

For this reason, the corner portions of the substrates and the intersection lines include therebeween a room having a thickness of the wall of the housing or more. It is preferable for the thickness to be 1.5 mm or more, or more preferably to be about 2 mm.

The condition (1) is set by the inequality expression in view of this room.

When the substrate has a size such that the corner portions locate outside the intersection lines X1, X2, the corner portions can be chamfered for example such that the corner portions do not locate outside the intersection lines X1, X2.

Hereinafter, a specific embodiment will be described.

Figure 4:
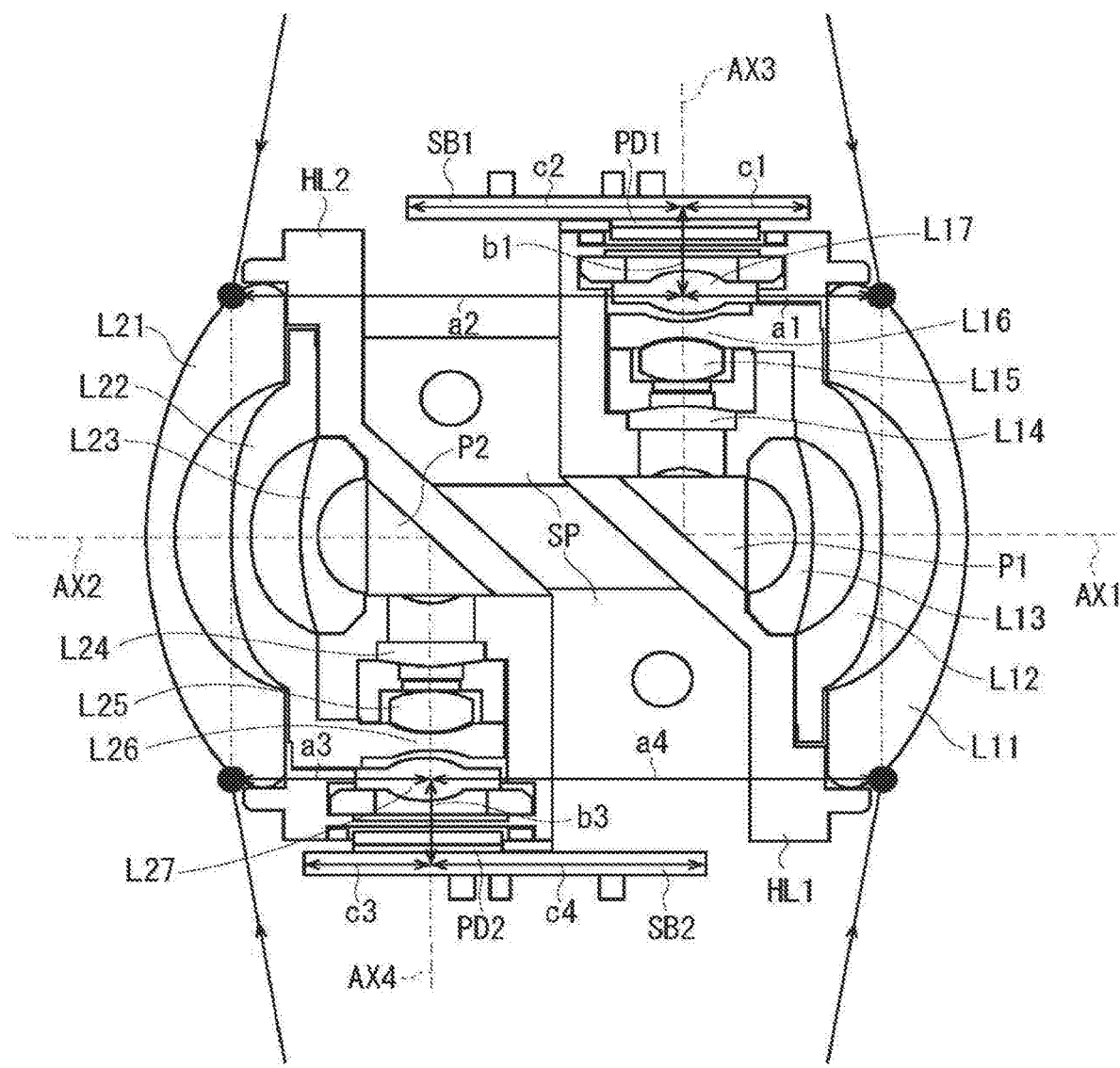
FIG. 4 is a view illustrating an omnidirectional imaging device in which two imaging optical systems are combined.

FIG. 4 is a view illustrating an omnidirectional imaging device in which two imaging optical systems are combined.

FIG. 4 has reference numbers different from those in FIG. 1 because FIG. 4 illustrates the specific embodiment.

A wide-angle lens of one photographing optical system includes seven lenses L11-L17 and a prism P1. The lenses L11-L13 constitute a front group and the lenses L14-L17 constitute a back group. The prism P1 is a right-angle prism, is provided on an optical axis AX1 of the front group, internally reflects the light beams from the front group toward the back group and bends the optical axis of the front group at 90 degrees toward the back group.

The wide-angle lens constituted by the lenses L11-L17 and the prism P1 (hereinafter referred to as a first wide-angle lens) is held in a holder HL1 as a lens barrel, and is integrated in a predetermined positional relationship.

A wide-angle lens of the other photographing optical system includes seven lenses L21-L27 and a prism P2. The lenses L21-L23 constitute a front group and the lenses L24-L27 constitute a back group. The prism P2 is a right-angle prism, and is provided on the optical axis AX2 of the front group, internally reflects the light beams from the front group toward the back group and bends the optical axis of the front group at 90 degrees toward the back group.

The wide-angle lens constituted by the lenses L21-L27 and the prism P2 (hereinafter, referred to as a second wide-angle lens) is held in a holder H2 as a lens barrel and is integrated in a predetermined positional relationship.

Both of the first and second wide-angle lenses include an angle of view over 180 degrees, and the imaging light beams enter in the lenses L11, L21 as illustrated in the figure.

Reference numbers PD1, PD2 illustrate imaging sensors, respectively, in FIG. 4. These are similar to the imaging sensors ISA, ISB illustrated in FIG. 1.

The imaging sensor PD1 is provided in a substrate SB1 which is larger than the imaging sensor and has a predetermined circuit.

The imaging sensor PD1 is positioned such that the optical axis AX3 of the back group of the first wide-angle lens passes through the center of the light-receiving surface and an image by the first wide-angle lens is imaged on the light-receiving surface.

Similarly, the imaging sensor PD2 is provided in a substrate SB2 which is larger than the imaging sensor and has a predetermined circuit system. The imaging sensor PD2 is positioned such that the optical axis AX4 of the back group of the second wide-angle lens passes through the center of the light-receiving surface and the image by the second wide-angle lens images on the light-receiving surface.

The first wide-angle lens and the second wide-angle lens are arranged such that the front groups face opposite directions to each other (the front group of the first wide-angle lens group faces the right and the front group of the second wide-angle lens faces the left in FIG. 4) and the back groups face opposite directions to each other (the back group of the first wide-angle lens faces up and the back group of the second wide-angle lens faces down in FIG. 1).

The front group optical axis AX1 of the first wide-angle lens is located on a straight line which is the same as the front group optical axis AX2 of the second wide-angle lens. The prisms P1, P2 are combined such that the reflection surface portions face each other.

Figure 5:
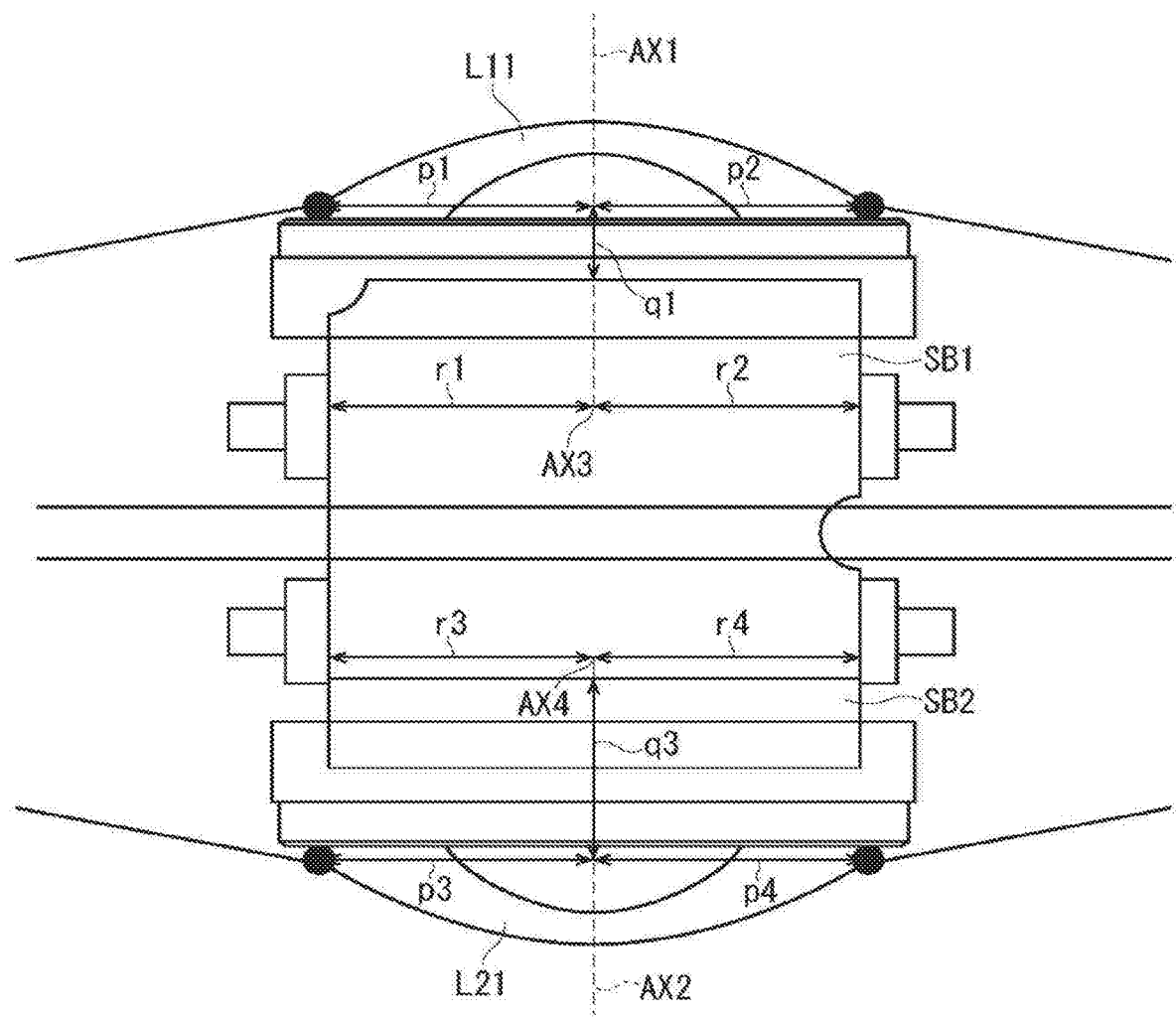
FIG. 5 is a view illustrating an omnidirectional imaging device in which two imaging optical systems are combined.

Reference number SP in FIG. 5 illustrates a spacer which maintains the space between the first and second wide-angle lenses.

The first and second wide-angle lenses have the same constitution and the same specification, and have the same maximum angle of view F.

A distance between the incident position of the incident light beam of the maximum angle of view and the back group optical axis AX3 in the plane (plane in FIG. 4) made by the front group optical axis AX1 and the back group optical axis AX3 of the first wide-angle lens is a1 as illustrated in FIG. 4.

A distance between the incident position of the incident light beam of the maximum angle of view and the imaging sensor PD1, which is parallel to the back group optical axis AX3, is b1 as illustrated in FIG. 4.

A distance between the center of the imaging sensor PD1 and the end portion of the substrate SB1 on the front group side is c1 as illustrated in FIG. 4.

Similarly, a distance between the incident position of the incident light beam of the maximum angle of view and the back group optical axis AX4 in the plane made by the front group optical axis AX2 and the back group optical axis AX4 of the second wide-angle lens is a3 as illustrated in FIG. 4.

A distance between the incident position of the incident light beam of the maximum angle of view and the imaging sensor PD2, which is parallel to the back group optical axis AX4, is b3 as illustrated in FIG. 4.

A distance between the center of the imaging sensor PD2 and the end portion of the substrate SB2 on the front group side is c3 as illustrated in FIG. 4.

FIG. 5 is a view illustrating the condition in FIG. 4 as seen from the above and the relationship of the front group lens L11, the front group optical axis AX1, the back group optical axis AX3, and the substrate SB1, and also the relationship of the front group lens L21, the front group optical axis AX2, the back group optical axis AX4, and the substrate SB2. A part of the substrate SB2 is the shade of the substrate SB1.

A distance between the front group optical axis AX1 and the incident position of the incident light beam at the maximum angle of view in the first wide-angle lens is P1, a distance from the incident position of the incident light beam at the maximum angle of view to the end portion of the substrate SB1 on the front group side, which is parallel to the front group optical axis AX1 is q1, and a distance from the center (corresponding to the position of the back group optical axis AX3) of the imaging sensor on the substrate SB1 to the end portion of the substrate SB1, which is parallel to the direction orthogonal to the front group optical axis AX1 of the substrate SB1, is r1.

Similarly, a distance between the front group optical axis AX2 and the incident position of the incident light beam at the maximum angle of view in the second wide-angle lens is P3, a distance from the incident position of the incident light beam at the maximum angle of view to the end portion of the substrate SB1 on the lens L21 side, which is parallel to the front group optical axis AX2 is q3, and a distance from the center (corresponding to the position of the back group optical axis AX4) of the imaging sensor on the substrate SB2 to the end portion of the substrate SB2, which is parallel to the direction orthogonal to the front group optical axis AX3 of the substrate SB2, is r3.

FIG. 5 is a view which is bilaterally symmetric relative to the straight line formed by the optical axes AX1, AX3, and p1=p2, r1=r2, p3=p4 and r3=r4.

Referring to FIG. 4, a distance between the back group optical axis AX3 and the left side end portion of the substrate SB1 which is combined with the first wide-angle lens (the end portion on the side of the lens L21 of the second wide-angle lens) is c2.

Similarly, a distance between the back group optical axis AX4 and the right side end portion of the substrate SB2 which is combined with the second wide-angle lens (the end portion on the side of the lens L11 of the first wide-angle lens) is c4.

These distances c2, c4 are arbitrarily set if each of the imaging optical systems is individually used. However, in the case that the two imaging optical systems are combined as illustrated in FIGS. 4, 5, the substrate SB1 blocks the incident light beam of the second wide-angle lens if the distance c2 is increased.

Similarly, the substrate SB2 blocks the incident light beam of the first wide-angle lens if the distance c4 is increased.

The distance c1+c2 is a size of the substrate SB1 in the direction parallel to the front group optical axis AX1 of the first wide-angle lens, and the distance c3+c4 is a size of the substrate SB2 in the direction parallel to the front group optical axis AX2 of the second wide-angle lens.

The size of the substrates SB1, SB2 can not be arbitrary set because a predetermined circuit system is mounted on the substrates SB1, SB2.

It is necessary for the substrate SB1 not to block the incident light beam of the second wide-angle lens and also for the substrate SB2 not to block the incident light beam of the first wide-angle lens. To do this the distance between the first and second wide-angle lenses (distance between the reflection surfaces of the prisms P1, P2) is adjusted by using a spacer SP. Namely, this adjustment corresponds to the adjustment of the distance D in the above description in FIGS. 1-3.

In the case of constituting the omnidirectional imaging device by combining two imaging optical systems, the front groups of the wide-angle lenses of the imaging optical systems are placed to face opposite directions to each other and the back groups of the wide-angle lenses of the imaging optical systems are placed to face opposite directions to each other, the optical axes AX1, AX2 of the front group of the wide-angle lenses are located on the same straight line, the reflection surfaces face each other, and the distance between the reflection surface portions is set such that the substrate on which the imaging sensor of one imaging optical system is mounted does not block the incident light beam to the wide-angle lens of another imaging optical system.

In the case of actually manufacturing the omnidirectional imaging device, the structure in which the optical system, imaging sensor, substrate and the spacer are combined as illustrated in FIGS. 1, 2 is housed in the housing of the device, but the housing is arranged between the end portion of the substrate and the light beam of the maximum angle of view.

As described above, it is preferable for the thickness of the housing to be preferably 1.5 mm or more, or more preferably 2.0 mm or more.

EXAMPLE

Hereinafter, a specific example will be described.

One specific example of the wide-angle lens constituted by the seven lenses and the prism with reference to FIGS. 4, 5 is as follows.

In the following example, f is a focal length of an entire system, No is an F-number and ω is a full angle of view.

The surface numbers are sequentially 1-23 from the object side, and illustrate a lens surface, incident and emission surfaces and a reflection surface of a prism, an aperture stop surface and a surface of an IR filter and a light-receiving surface of an imaging sensor.

R is a curvature radius of each surface, and is a paraxial curvature radius in an aspheric surface.

D is a surface interval, Nd is a refractive line of d-line, and νd is an Abbe's number. The object distance is infinity. The unit of the length is mm.

EXAMPLE

| f = 0.75, No = 2.14, ω = 190 DEGREES | | | | |
|---|---|---|---|---|
| SURFACE NUMBER | R | D | Nd | νd |
| 1 | 17.1 | 1.2 | 1.834807 | 42.725324 |
| 2 | 7.4 | 2.27 | | |
| 3* | −1809 | 0.8 | 1.531131 | 55.753858 |
| 4* | 4.58 | 2 | | |
| 5 | 17.1 | 0.7 | 1.639999 | 60.078127 |
| 6 | 2.5 | 1.6 | | |
| 7 | ∞ | 0.3 | | |
| 8 | ∞ | 5 | 1.834000 | 37.160487 |
| 9 | ∞ | 1.92 | | |
| 10 | ∞ (APERTURE STOP) | 0.15 | | |
| 11 | 93.2 | 1.06 | 1.922860 | 18.896912 |
| 12 | −6.56 | 1.1 | | |
| 13 | ∞ | −0.1 | | |
| 14 | 3.37 | 1.86 | 1.754998 | 52.321434 |
| 15 | −3 | 0.7 | 1.922860 | 18.896912 |
| 16 | 3 | 0.3 | | |
| 17* | 2.7 | 1.97 | 1.531131 | 55.753858 |
| 18* | −2.19 | 0.8 | | |
| 19 | ∞ | 0.4 | 1.516330 | 64.142022 |
| 20 | ∞ | 0 | | |
| 21 | ∞ | 0.3 | 1.516330 | 64.142022 |
| 22 | ∞ | 0.3 | | |
| 23 | IMAGING SURFACE | | | |

[Aspheric Surface]

Surfaces having * (both surfaces of second lens in front group and both surfaces of final lens in back group) in the above data are aspheric surfaces.

An aspheric surface shape is expressed by the following known equation by using an inverse of a paraxial curvature radius (paraxial curvature) C, a height from an optical axis H, a conical constant K, and an aspheric surface coefficient of each order with X as the aspheric surface amount in the optical axis direction, and is defined by providing the paraxial curvature radius, conical constant and aspheric surface coefficient.

$$X = CH^2/[1+\sqrt{\{1-(1+K)C^2H^2\}}] + A4 \cdot H^4 + A6 \cdot H^6 + A8 \cdot H^8 + A10 \cdot H^{10} + A12 \cdot H^{12} + A14 \cdot H^{14}$$

The aspheric surface data of the above example is as follows.

4th, 6th, 8th, 10th, 12th, 14th are A4-A14 of even-ordered aspheric coefficients after 4th order.

Third Surface
4th: 0.001612
6th: −5.66534 e-6
8th: −1.99066 e-7
10th: 3.69959 e-10
12th: 6.47915 e-12
Fourth Surface
4th: −0.00211
6th: 1.66793 e-4
8th: 9.34249 e-6
10th: −4.44101 e-7
12th: −2.96463 e-10
Seventeenth Surface
4th: −0.006934
6th: 1.10559 e-3
8th: 5.33603 e-4
10th: −1.09372 e-4
12th: 1.80753-5
14th: −1.52252 e-7
Eighteenth Surface
4th: 0.041954
6th: −2.99841 e-3
8th: −4.27219 e-4
10th: 3.426519 e-4
12th: −7.19338 e-6
14th: −1.69417 e-7

In the above aspheric surface data, for example, −1.69417e-7 means−$1.69417×10^{-7}$.

The optical path length of the light beam passing through the center of the wide-angle lens having an angle of view over 180 degrees and the light beam passing through the peripheral of the wide-angle lens having an angle of view over 180 degrees change according to a difference between the thicknesses of the lens. Such a change deteriorates a performance. In the wide-angle lens of the example, the second lens often has a difference between a thickness near the optical axis and a thickness in the peripheral portion in the three lenses. The second lens is corrected by using aspheric surfaces on both surfaces as a plastic lens.

The aberrations occurring in the lenses on the object side of the last lens of the back group can be preferably corrected by using aspheric surfaces on both surfaces of the last lens of the back group as a plastic lens.

By cementing the second biconvex lens and the third biconcave lens in the four lenses of the back group, the chromatic aberration is preferably corrected.

Figure 6:
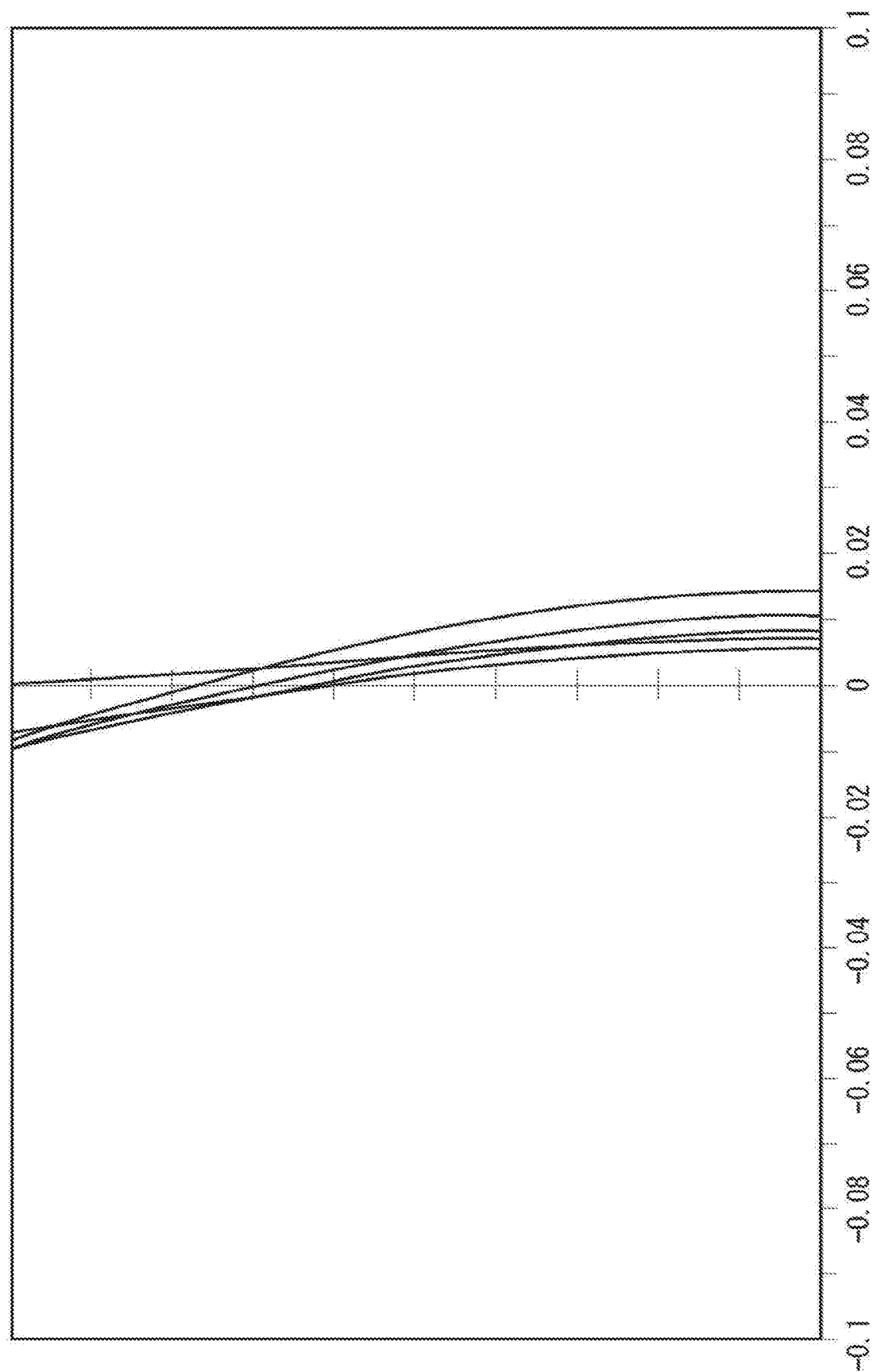
FIG. 6 is a spherical aberration view of a wide-angle lens according to Example.
Figure 7:
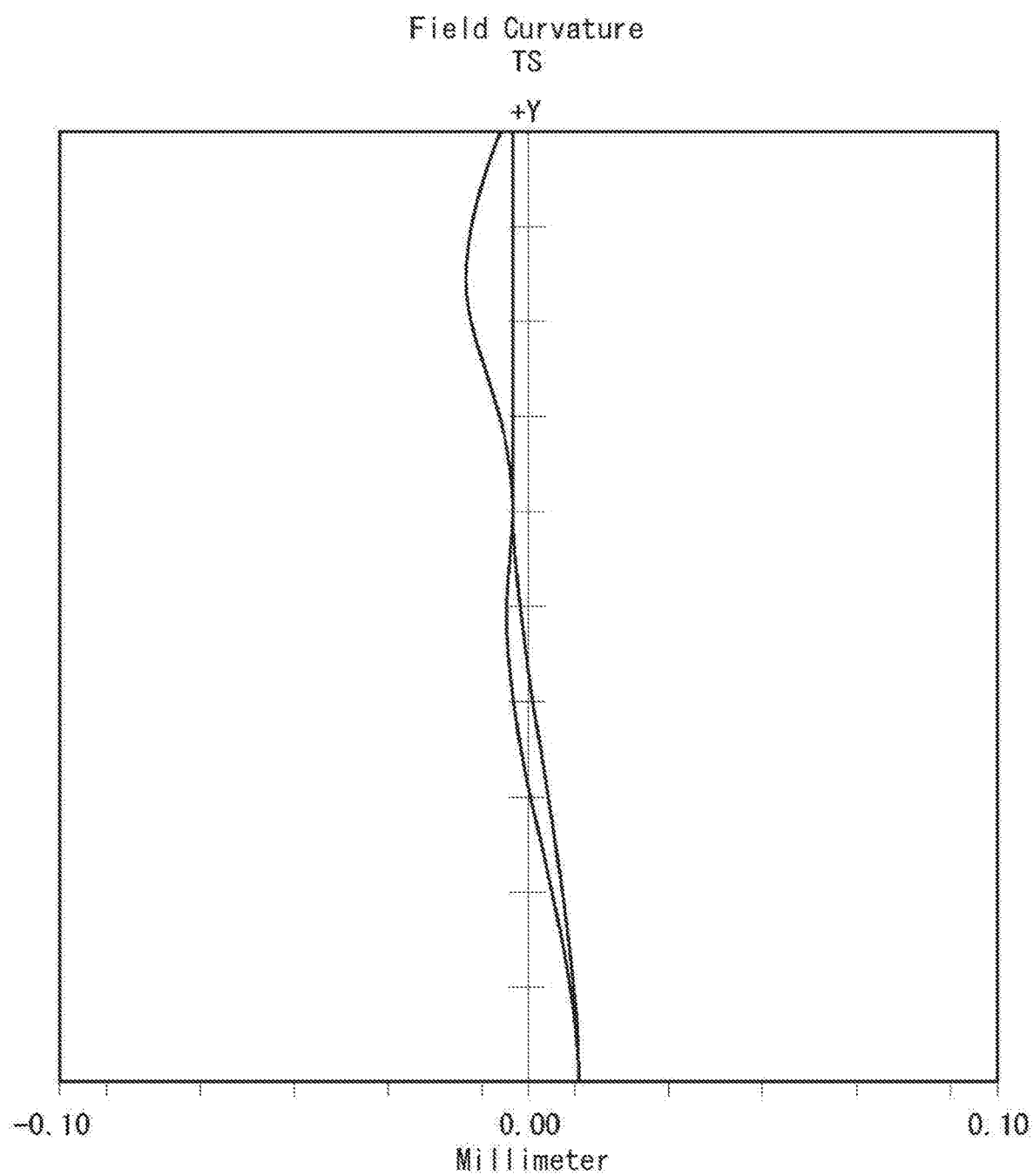
FIG. 7 is a field curvature view of a wide-angle lens according to Example.

The spherical aberration and the field curvature of the wide-angle lens of the example are illustrated in FIGS. 6, 7, respectively.

Figure 8:
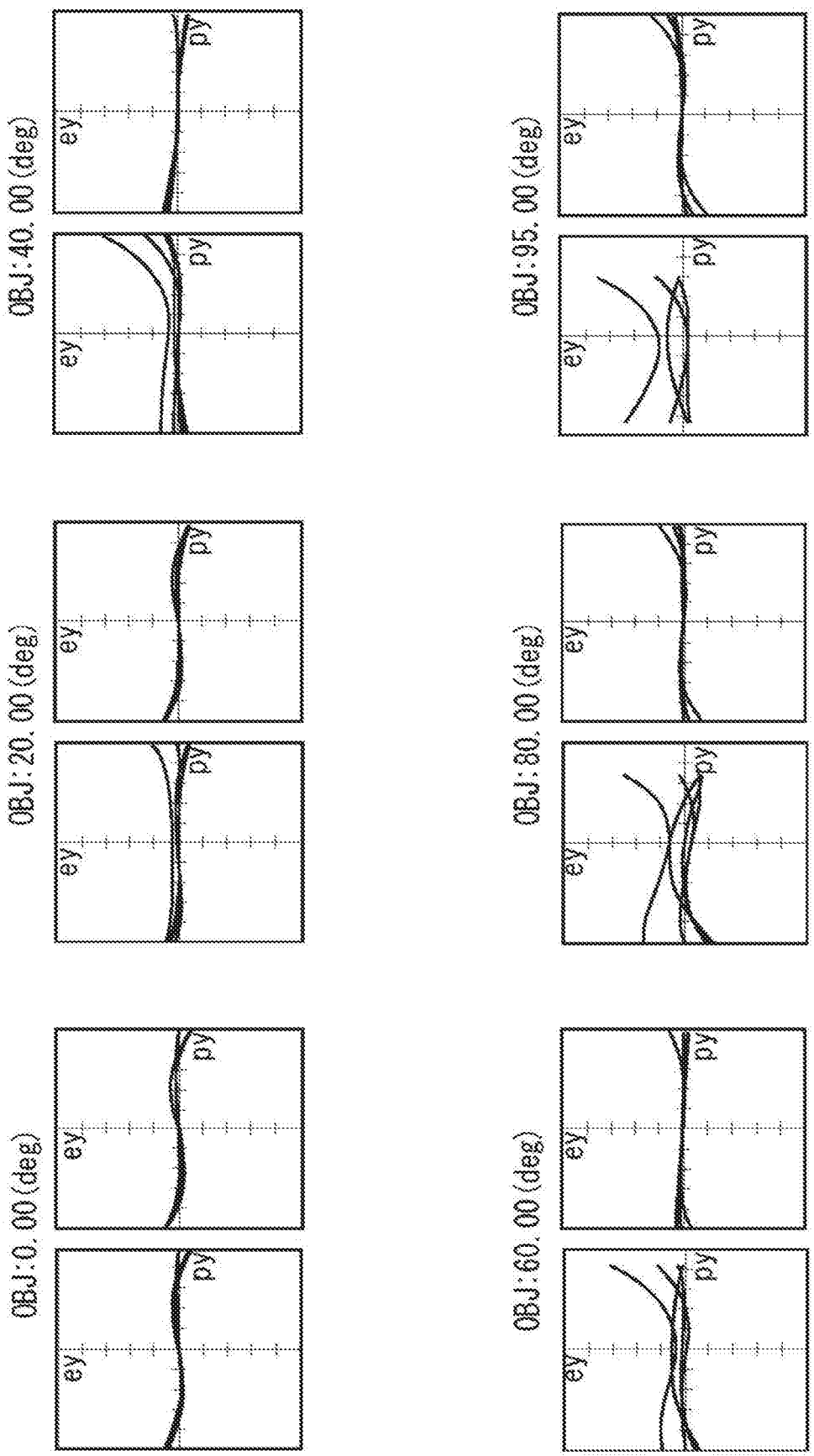
FIG. 8 is a coma aberration view of a wide-angle lens according to Example.

FIG. 8 illustrates the coma aberration.

Figure 9:
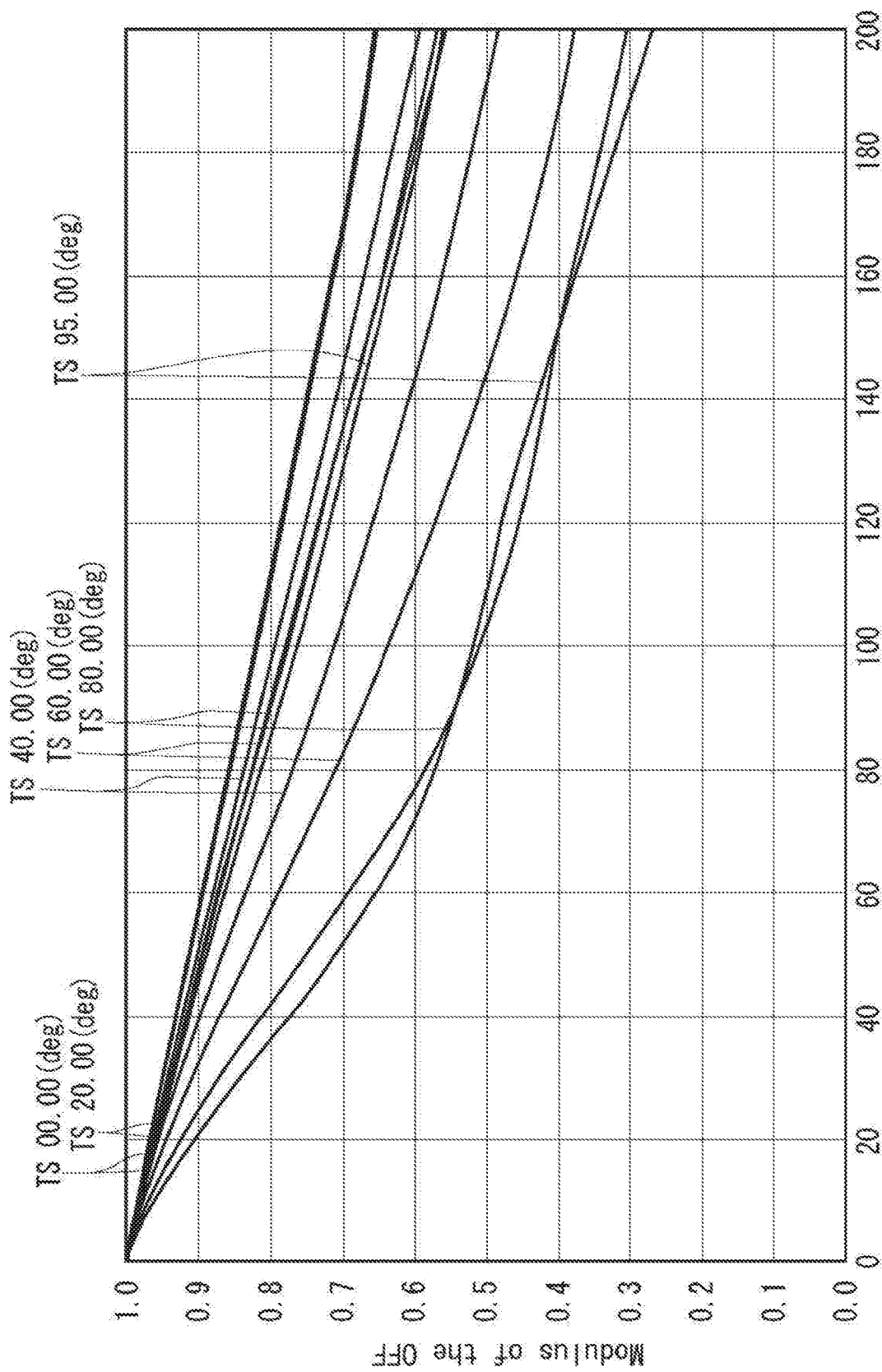
FIG. 9 is a view illustrating an OTF feature of a wide-angle lens according to Example.
Figure 10:
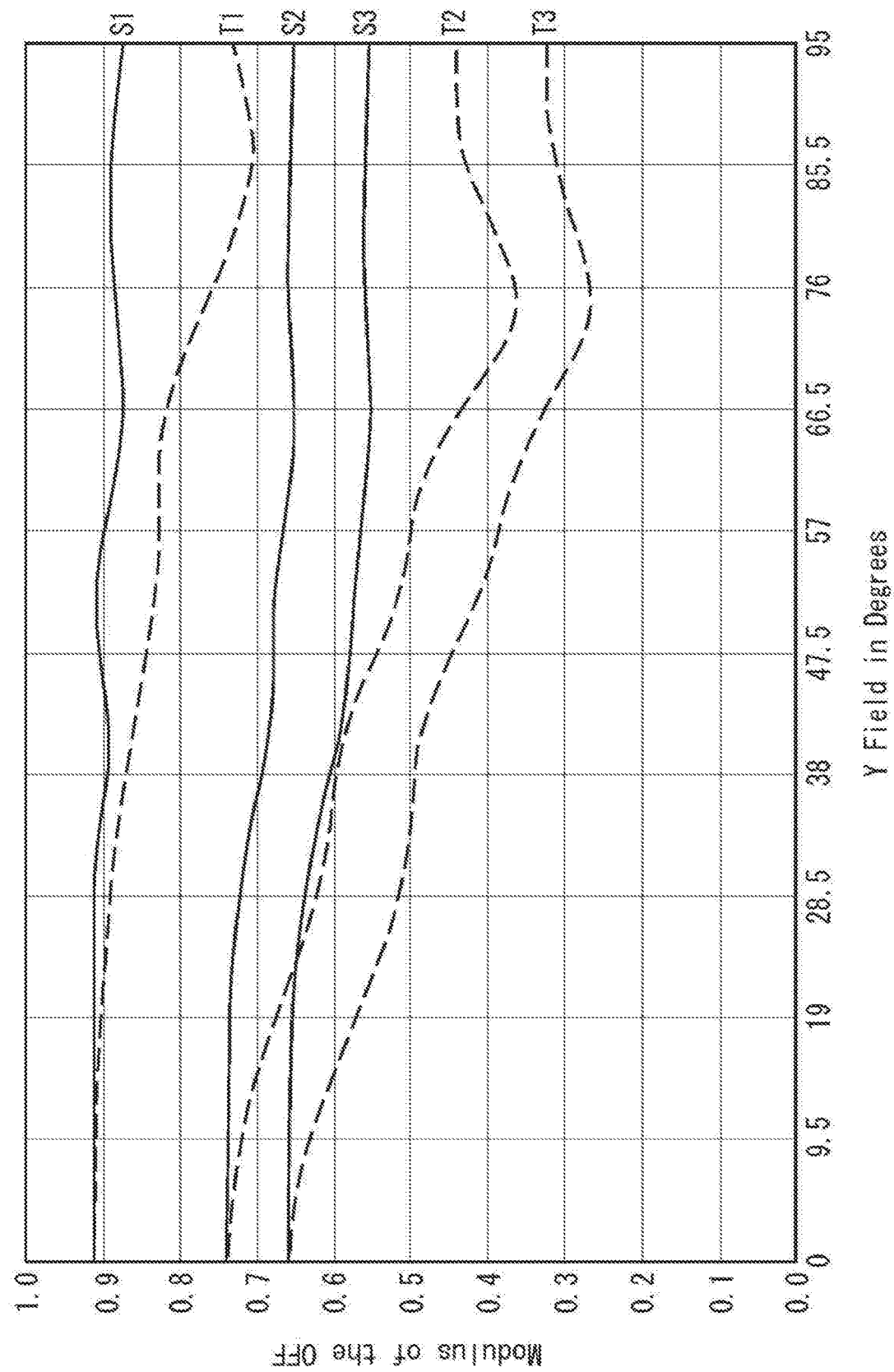
FIG. 10 is a view illustrating an OTF feature of a wide-angle lens according to Example.

FIGS. 9, 10 are view each illustrating an OTF feature. The horizontal axis illustrates spatial frequency in FIG. 9 and half angle of view by degree in FIG. 10.

As is apparent from these figures, the performance of the wide-angle lens of the example is extremely high.

The imaging sensor and the substrate are combined to the wide-angle lens to obtain the imaging optical system, and the same two imaging optical systems are combined as illustrated in FIGS. 4, 5.

Each of the distances illustrated in FIG. 4 is as follows.
a1=a3=7.96 mm, b1=b3=2.84 mm, and c1=c3=5.00 mm. The angle of view F is 190 degrees, and the above conditions (1), (2) are satisfied, and the corner portion of the substrate does not block the imaging light beam.

The distance a2 (the distance between the incident position of the maximum incident angle light beam in the second wide-angle lens and the back group optical axis of the first wide-angle lens), the distance a4 (the distance between the incident position of the maximum incident angle light beam in the first wide-angle lens and the back group optical axis of the second wide-angle lens=a2), and the distance b1 (=b3) and the distance c2 (=c4) are a2=17.98 mm, b1=2.84 mm, and c2=11.00 mm. The angle of view F is 190 degrees, the substrate SB1 does not block the incident light beam to the second wide-angle lens and the substrate SB2 does not block the incident light beam to the first wide-angle lens.

The values of the distances in FIG. 5 are as follows.
p1 (=p2=p3=p4)=10.3 mm, q1=2.86 mm, q3=6.98 mm, r1 (=r2=r3=r4)=10.0 mm.

The wide-angle lens of the above example includes, in order from the object side to the image side, a meniscus lens having a negative refractive power, an aspheric surface meniscus lens having a negative refractive power, a negative meniscus lens, a prism having an inclined surface as an internal reflection surface, an aperture stop, a biconvex lens having a positive refractive power, a cemented lens of a biconvex lens having a positive refractive power and a biconcave lens having a negative refractive power and a biconvex lens having a positive refractive power. The meniscus lens having a negative refractive power, the aspheric surface meniscus lens having a negative refractive power and the negative meniscus lens constitute the front group. The biconvex lens having a positive refractive power, the cemented lens of the biconvex lens having a positive refractive power and the biconcave lens having a negative refractive power, and the biconvex lens having a positive refractive power constitute the back group. A distance from the most object side surface of the front group to the internal reflection surface LF and a distance from the internal reflection surface to the most image side surface of the back group LR satisfy the following condition (3).

$$LF<LR \qquad (3)$$

Since the omnidirectional imaging device in the above embodiment is constituted by combining the two wide-angle lenses of the above constitution, the omnidiretional imaging device can be downsized.

FIG. 11A is a view illustrating an omnidirectional imaging device in which the same two wide-angle lenses (the wide-angle lenses of the above example without the prism) without bending the optical path by a reflection surface are combined as the wide-angle lenses LWA, LWB.

The images by the two wide-angle lenses LWA, LWB are received by not shown imaging sensors, respectively, sent to an image processor 2, and synthesized to an omnidirectional image as an image in a 4π radian solid angle in the image processor 2.

The synthesized omnidirectional image is displayed on a display 3.

The wide-angle lenses LWA, LWB do not bend the optical paths, so that the distance from the most object side lens of the front group to the image surface R1 is long. A distance between the position where the incident light beams of the maximum angle of view of the wide angle lenses LWA, LWB intersect and the lens diameter optical axis is L1. The object in a distance smaller than the distance L1 is not imaged.

FIG. 11B is a view illustrating an omnidirectional imaging device in which the wide-angle lenses of the above example are combined as two wide-angle lenses LW1, LW2 (corresponding to the wide-angle lenses A0, B0 in FIG. 1).

Since the optical axes of the wide-angle lenses are bent, the distance 2R2 between the most object side lenses of the front groups is reduced, and the distance between the position where the incident light beams of the maximum angle of view of the two wide angle lenses intersect and the front group optical axis L2 is reduced.

The above distances R1, L1, R2, L2 are expressed as follows by using the angle of view F of the wide-angle lens.

$$L1=-R1\cdot\tan(F/2)$$

$$L2=-R2\cdot\tan(F/2)$$

The maximum angle of view of each of the wide-angle lenses LWA, LWB, LW1, LW 2 is 190 degrees.

In the constitution illustrated in FIG. 11A, R1=20 mm, L1=229 mm. In the constitution illustrated in FIG. 11B, R2=12.5 mm and L2=142.8 mm.

Therefore, an omnidirectional image to a further closed distance can be imaged while downsizing the imaging optical system.

In the example illustrated in FIG. 11B, a part of the light beam is blocked by the image processor 2. This portion becomes a portion to be held by hand in the case of constituting a portable omnidirectional imaging device. For this reason, there is no problem if the image of this portion is not imaged. This portion can be set in a non-imaged space by downsizing the image processor 2.

Hereinafter, an embodiment in which the imaging system is used as an omnidirectional imaging device will be described.

For the purpose of simplifying the description, the sane reference numbers as those in FIG. 1 are used.

Figure 12:
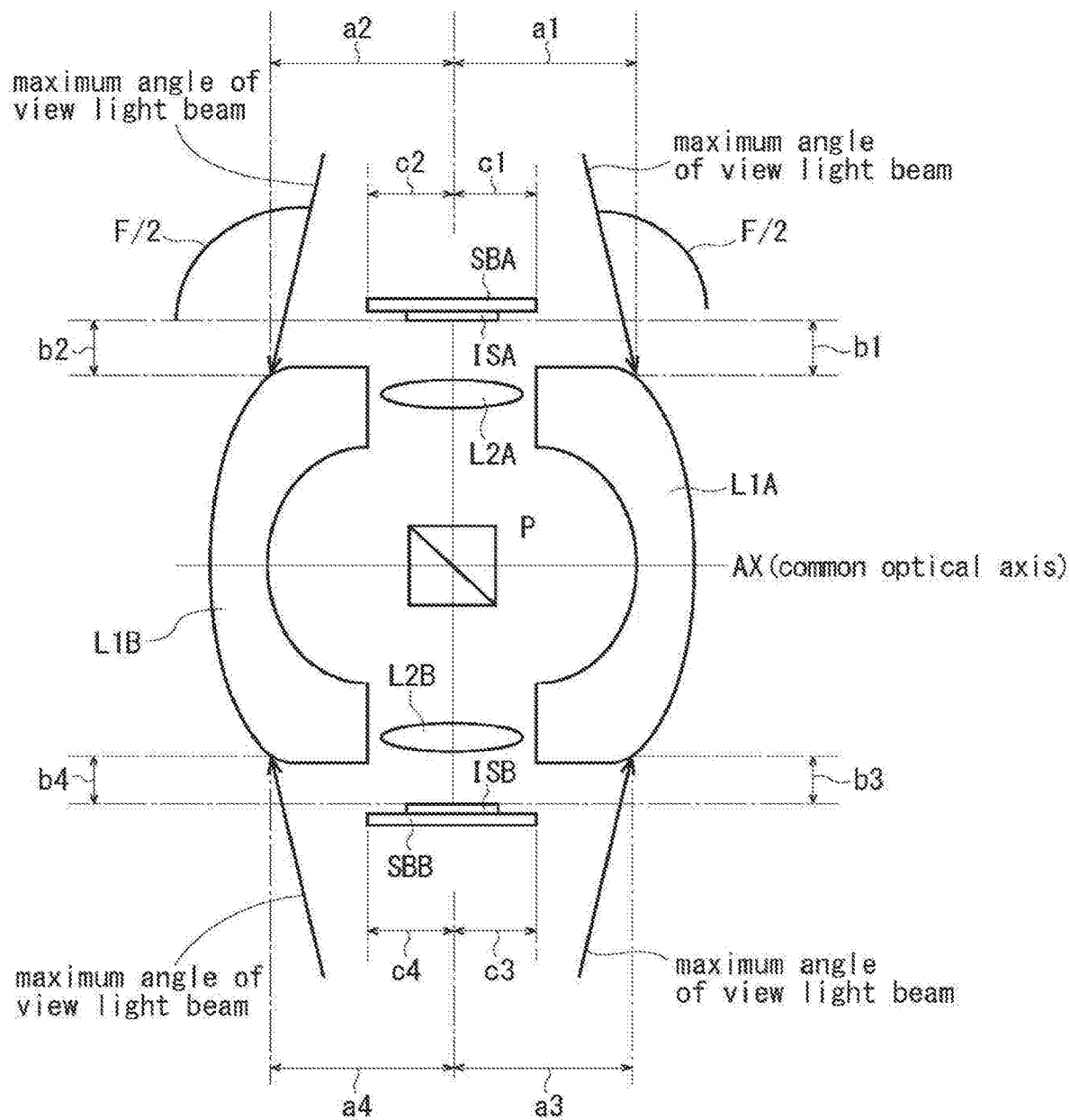
FIG. 12 is a view illustrating one embodiment of an imaging system.

In FIG. 12, reference number L1A denotes a lens, P denotes a prism, and L2A denotes a lens. These lens L1A, prism P, and lens L2A constitute an optical system. Reference number ISA denotes an imaging element, and SBA denotes a substrate on which the imaging element ISA is mounted.

Such an optical system, imaging element ISA and substrate SBA constitute one imaging body. Similarly, reference number L1B denotes a lens, P denotes a prism and L2B denotes a lens. These lens L1B, prism P and lens L2B constitute the optical system. Reference number ISB denotes an imaging element and reference number SBB denotes a substrate on which the imaging element ISB is mounted.

Such an optical system, imaging element ISB and substrate SBB constitute another imaging body.

Namely, the imaging system in FIG. 12 includes two imaging bodies each having an optical system and an imaging element which converts light condensed by the optical system into image signals.

The prism P is a reflection member, and is used for both of the optical systems of the two imaging bodies.

The lenses L1A, L1B are illustrated by simplifying the lenses on the object side of the reflection member P in the optical system. Similarly, the lenses L2A, L2B are illustrated by simplifying the lenses on the image side of the reflection member P in the optical system. Each of the lenses L1A, L1B generally includes a plurality of lenses.

These optical systems are the same. For example, the above-described optical systems can be used.

The imaging elements ISA, ISB are the same as the above-described imaging sensors.

The maximum angle of view in the optical system of each imaging body is F. F/2 in FIG. 12 denotes a half angle of view according to the maximum angle of view.

Regarding each of the optical systems constituted by the lenses L1A, L2A and prism P as illustrated in FIG. 12, a distance from the incident light beam position at the maximum angle of view in the optical system to the reflection position of the prism P at center angle of view in the optical system is a1, a3, a distance from the incident light beam position at the maximum angle of view to the surface of the sensor is b1, b3 and a distance from the center of the sensor of the substrate SBA, SBB to the substrate end on the incident light beam side is c1, c3.

The following condition (4) should be satisfied for each optical system where the maximum angle of view of the optical system of the imaging body is F, a distance from the incident light beam position at the maximum angle of view in the optical system to the reflection position on the reflection member at a center angle of view in the optical system is a, a distance from the incident light beam position at the maximum angle of view to the imaging element is b, and a distance from the center of the imaging device in the substrate provided with the imaging element to the end of the substrate is c.

$$c \leq a + b/\tan(F/2) \quad (4)$$

Regarding the optical system constituted by the lenses L1A, L2A and the prism P, the distance a is a1, a3, the distance b is b1, b3 and the distance c is c1, c3.

The specific numerical values are as follows.
a 1=a 3=7.96 mm
b1=b3=2.84 mm
c1=c3=5.50 mm The maximum angle of view F is 190 degrees (namely, F/2=95 degrees, tan (F/2)=−11.43).

If the above values are substituted into the condition (4), the condition (4) is satisfied as follows.

$$5.50 \leq 7.96 - 2.84/11.43 \approx 7.96 - 0.248 = 7.71$$

Namely, the maximum angle of view light beam entering in the lens L1A is not blocked by the end portions of the substrates SBA, SBB on the lens L1A side.

Similarly, regarding each of the optical system constituted by the lenses L1B, L2B and prism P, a distance from the incident light beam position at the maximum angle of view in the optical system to the reflection position of the prism P at a center angle of view in the optical system is a2, a4, a distance from the incident light beam position at the maximum angle of view to the surface of the sensor is b2, b4 and a distance from the center of the sensor of the substrates SBA, SBB to the substrate end on the incident light beam side is c2, c4.

Regarding the optical system constituted by the lenses L1B, L2B and the prism P, in the condition (4), the distance a is a2, a4, the distance b is b2, b4 and the distance c is c2, c4.

The specific numerical values are as follows.
a2=a4=7.96 mm
b2=b4=2.84 mm
c2=c4=5.50 mm The maximum angle of view F is 190 degrees (namely, F/2=95 degrees, tan (F/2)=−11.43).

If the above values are substituted into the condition (4), the condition (4) is satisfied as follows.

$$5.50 \leq 7.96 - 2.84/11.43 \approx 7.96 - 0.248 = 7.71$$

Accordingly, the maximum angle of view light beam entering in the lens L1B is not blocked by the end portions of the substrates SBA, SBB on the lens L1B side.

It is further preferable for the distance between the end portions of the substrates SBA, SBB and the maximum angle of view light beam to be 2 mm or more. This is because the housing of the imaging system is disposed between the end portion of the substrate and the maximum angle of view light beam, and also this is because the housing requires a thickness of 2.0 mm or more for producing the housing made of metal or a resin cover.

In the above-described example, the left side value of the following condition (5) becomes 7.71−5.50=2.21, and the following condition (5) is satisfied.

$$a+b/\tan(F/2)-c \geq 2.0 \text{ [mm]} \quad (5)$$

Namely, a thickness of 2.0 mm of the housing is ensured.

Figure 13:
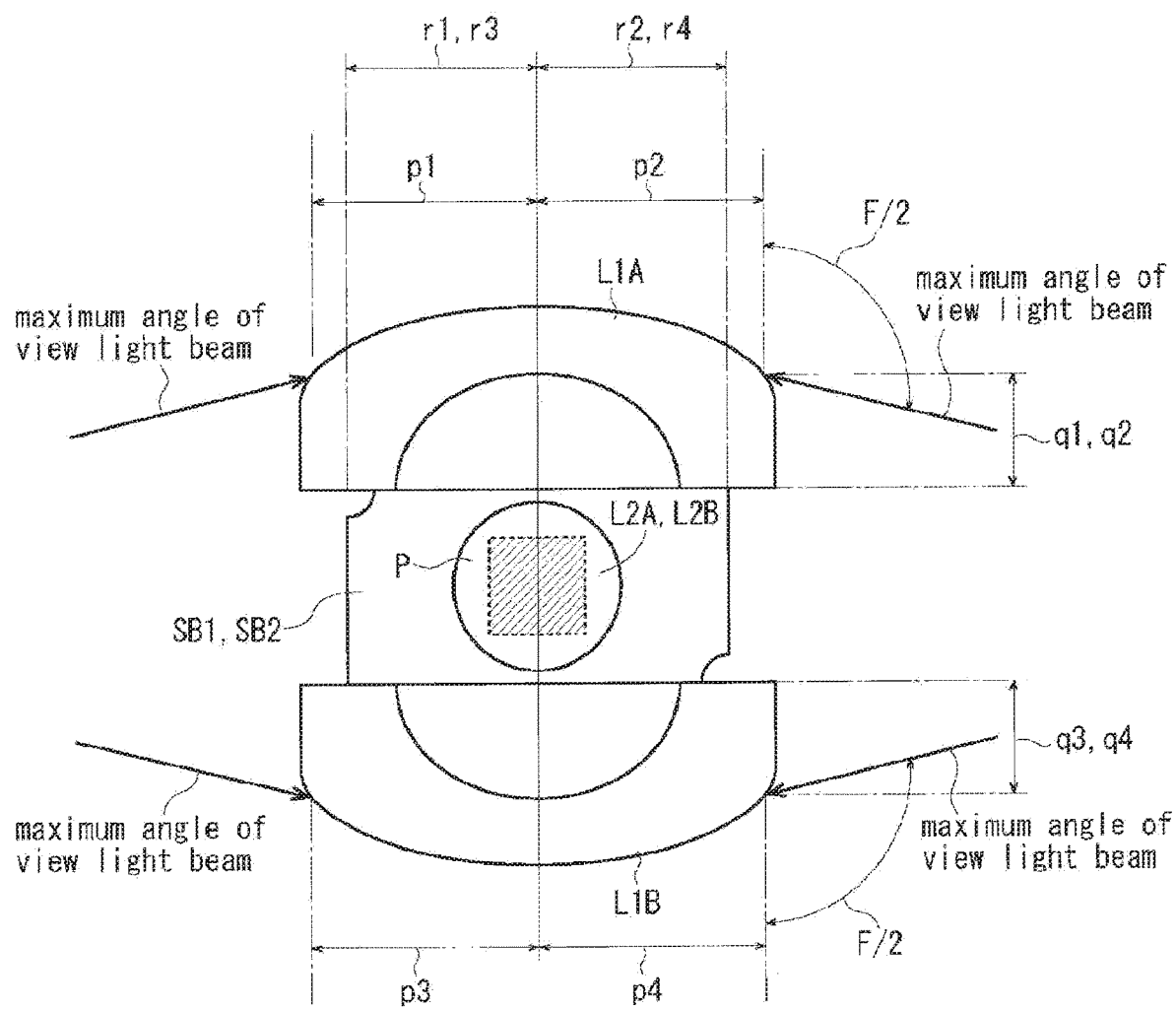
FIG. 13 is a view illustrating another embodiment of an imaging system.

Similarly, in an embodiment illustrated in FIG. 13, reference number L1A denotes a lens, P denotes a prism, and L2A denotes a lens. These lens L1A, prism P and lens L2A constitute an optical system. Reference number SB1 denotes a substrate on which a not shown imaging element is mounted.

Reference number L1B denotes a lens, P denotes a prism, and L2B denotes a lens. These lens L1B, prism P and lens L2B constitute an optical system. Reference number SB2 denotes a substrate on which an imaging element ISB is mounted.

The imaging system illustrated in FIG. 13 includes two imaging bodies each having the optical system, and the imaging element which converts light condensed by the optical system into image signals.

The prism P is a reflection member, and is used for both of the optical systems of the two imaging bodies.

The lenses L1A, L1B are illustrated by simplifying the lenses on the object side of the reflection member P in the optical system, and the lenses L2A, L2B are also illustrated by simplifying the lenses on the image side of the reflection member P in the optical system. The lenses L2A, L2B are overlapped to each other in the direction orthogonal to the figure. The substrates SB1, SB2 are also overlapped in the same manner.

The two optical systems are the same. For example, the above-described example of the optical system can be used.

The imaging elements ISA, ISB are similar to the above-described imaging sensors.

The maximum angle of view in the optical system of each imaging body is F. F/2 in FIG. 13 is a half angle of view according to the maximum angle of view.

As illustrated in FIG. 13, a distance from the incident light beam position at the maximum angle of view in the lens L1A to the incident light beam position at a center angle of view in the optical system is p1, p2, a distance from the incident light beam position at the maximum angle of view in the lens L1A to the end portion of the substrate SB1 is q1, q2 and a distance from the center of the imaging element of the substrate SB1 to the end of the substrate is r1, r2.

A distance from the incident light beam position at the maximum angle of view in the lens L1B to the incident light beam position at a center angle of view in the optical system is p3, p4 and a distance from the incident light beam position at the maximum angle of view in the lens L1B to the end portion of the substrate SB2 is q3, q4, and a distance from the center of the imaging element of the substrate SB2 to the end of the substrate is r3, r4.

The following condition (6) should be satisfied for each optical system where the maximum angle of view of the optical system of the imaging body is F (degree), a distance from the incident light beam position at the maximum angle of view in the optical system to the incident light beam position at a center angle of view in the optical system is p, a distance from the incident light beam position at the maximum angle of view to the end surface of the substrate is q and a distance from the center of the imaging element on the substrate provided with the imaging element to the end of the substrate is r.

$$r \leq p-q/\tan(F/2) \quad (6)$$

Regarding the optical system constituted by the lens L1A, L2A and prism P, the distance p is p1, p2, the distance q is q1, q2 and the distance r is r1, r2.

The specific numerical values are p1=p2=10.3 mm, q1=q2=2.4 mm, and r1=r2=9.0 mm, and F=190 degrees, so that the condition (6) is satisfied.

Namely, the condition (6) becomes as follows relative to p1, p2, q1, q2, r1, r2, and the condition (6) is satisfied.

$$9.0 \leq 10.3+(2.4/11.43) \approx 10.51$$

Similarly, regarding the optical system constituted by the lens L1B, L2B and prism P, the distance p is p3, p4, the distance q is q3, q4 and the distance r is r3, r4.

The specific numerical values are p3=p4=10.3 mm, q3=q4=6.98 mm, and r3=r4=9.0 mm, and F=190 degrees, so that the condition (6) is satisfied.

Namely, the condition (6) becomes as follows relative to p3, p4, q3, q4, r3, r4, and the condition (6) is satisfied.

$$9.0 \leq 10.3+(6.98/11.43) \approx 10.91$$

In these cases, the following condition (7) is satisfied where the maximum angle of view of the optical system of the imaging body is F (degree), a distance from the incident light beam position at the maximum angle of view in the optical system to the incident light beam position at center angle of view in the optical system is p, a distance from the incident light beam position at the maximum angle of view to the end surface of the substrate is q, and a distance from the center of the imaging element in the substrate provided with the imaging element to the end of the substrate is r.

$$p-q/\tan(F/2)-r \geq 1.5 \text{ [mm]} \quad (7)$$

Namely, relative to p=p1=p2=10.3 mm, q=q1=q2=2.4 mm, r=r1=r2=9.0 mm, the condition (7) becomes 10.51−9.0=1.51>1.5.

Moreover, relative to p=p3=p4=10.3 mm, q=q3=q4=6.98 mm, r=r3=r4=9.0 mm, the condition (7) becomes 10.91−9.0=1.91>1.5.

More specifically, the maximum angle of view light beam entering in the lens L1A is not blocked by the end portions of the substrates SB1, SB2 on the lens L1A side, and the maximum angle of view light beam entering in the lens L1B is not blocked by the end portions of the substrates SB1, SB2 on the lens L1B side.

The omnidirectional imaging device has a space relative to the thickness of the housing.

In the embodiments illustrated in FIGS. 12, 13, the prism P is provided in the optical system.

With this constitution, the width of the device can be reduced compared to an imaging body in which the optical axis of the lens system is not bent. A mirror can be used for the reflection member, but the prism is preferable. By using the prism, the reflection member includes both of a function as a lens by the bending of the prism and a reflection function. Thus, the number of lenses of the entire optical system can be reduced. As a result, the width of the imaging body can be reduced by using the prism. Moreover, sensitivity relative to the tilt of the reflection member is lowered by using the prism. Thus, a change in a substrate position due to variations in an attachment position of a prism can be controlled.

In the embodiments illustrated in FIGS. 12, 13, the above example is used for the optical system. The optical system includes a first lens group having a negative power arranged on the object side and a second lens group arranged on the image side. At least one of the first and second lens groups includes an aspheric surface lens.

With this constitution, the diameter of the lens can be reduced compared to the optical system using only a spherical lens. In the specific example, the aspheric surface lens is used for both of the second lens of the first lens group and the fourth lens of the second lens group.

The image information output from respective image sensors is synthesized in a not shown image processor, and is processed as one image.

The image processor connects respective images from 0 to 180-degree angle of view to be used for a final image. The connected image can be formed from the positional relationship of the two imaging bodies. The portions where the images become the same as each other, namely, the images from 180-190 degrees can be used as reference data for connecting both images.

Therefore, the images can be accurately connected even if the positional relationship of the two imaging bodies is changed due to environmental temperature.

Accordingly, an omnidirectional image can be displayed.

As described above, a new imaging optical system, omnidirectional imaging device and imaging system can be achieved. In each of the imaging optical systems of the omnidirectional imaging device, the incident light beam to the wide-angle lens is not blocked by the substrate provided with the imaging sensor. The incident light beam to the optical system in the imaging system is not blocked by the substrate provided with the imaging element.

In the wide-angle lenses of the two imaging optical systems for use in the omnidirectional imaging device, the imaging optical path is bent at 90 degrees by the reflection surface, so that the distance between the first lenses of the front groups which face opposite directions to each other can be reduced; thus, the omnidirectional imaging device can be downsized.

What is claimed is:

1. An imaging system, comprising:
a plurality of optical systems each including a wide-angle lens and an imaging sensor;
each of the plurality of optical systems including a reflector including a reflection surface, each of the wide-angle lenses including a first lens group and a second lens group, the first lens group arranged on an object side and the second lens group is arranged on an image side; and
each of the image sensors configured to change an object image formed by the wide angle lens into an image signal, each of the imaging sensors being disposed on a corresponding substrate,
each of the optical systems satisfy the following condition:

$LF<LR$, where

LF is a first distance from a first surface of the first lens group to the reflection surface, the first surface being a closest lens surface to the object side, and
LR is a second distance from a second surface of the second lens group to the reflection surface, the second surface being a closest lens surface to the image side,
wherein:
the plurality of optical systems include a common housing,
each of the imaging sensors and the corresponding substrates are housed in the common housing,
each of the plurality of optical systems satisfy the following condition:

$c \leq a+b/\tan(F/2)$, where

F is a maximum angle of view (degree) of the optical system,
a is a distance from an incident light beam position at the maximum angle of view in the optical system to a reflection position on the reflector at a center angle of view in the optical system,
b is a distance from the incident light beam position at the maximum angle of view to the imaging sensor, and
c is a distance from a center of the imaging sensor in the substrate provided with the imaging sensor to an end of the substrate.

2. The imaging system according to claim 1, wherein:
a part of the common housing is arranged between the substrate and the incident light beam position at the maximum angle of view.

3. The imaging system according to claim 1, wherein each of the optical systems further satisfies the following condition:

$a+b/\tan(F/2)-c \geq 2.0$ [mm].

4. The imaging system according to claim 1, wherein the reflector of the optical systems comprises a corresponding prism.

5. The imaging system according to claim 4, wherein an aperture stop is arranged on an image side of the prism.

6. The imaging system according to claim 1, further comprising:
a processor configured to synthesize a plurality of images captured by the image sensors into an omnidirectional image.

* * * * *